Oct. 24, 1961 P. W. LEE 3,005,663
TRACTION DEVICE
Filed Dec. 4, 1959 2 Sheets-Sheet 2
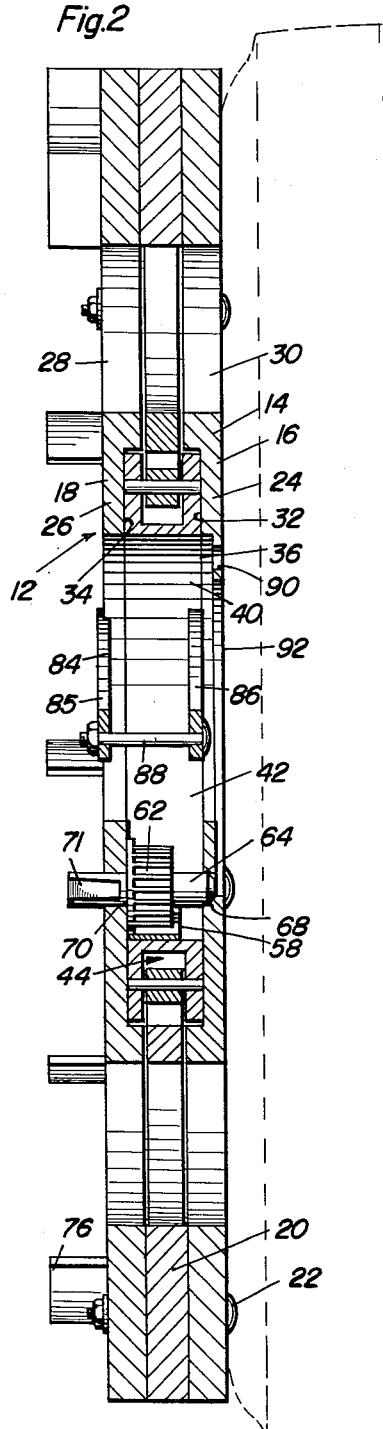
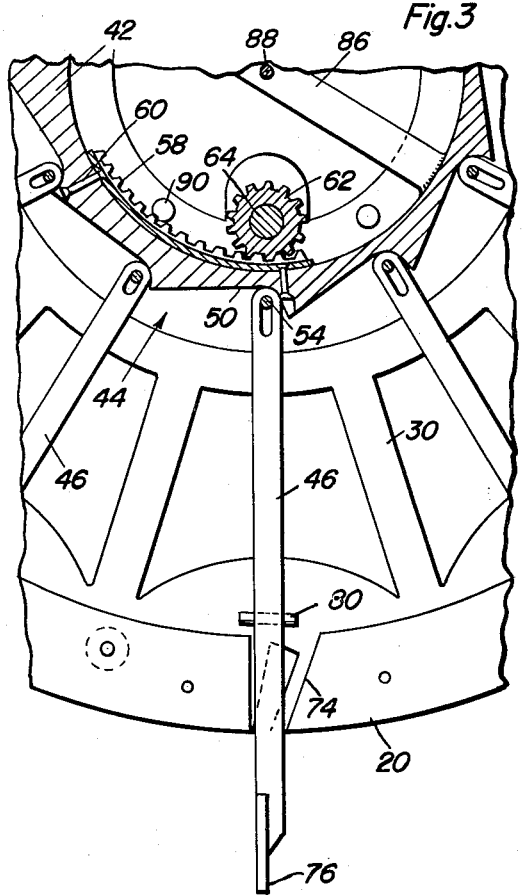
Peter W. Lee
INVENTOR.

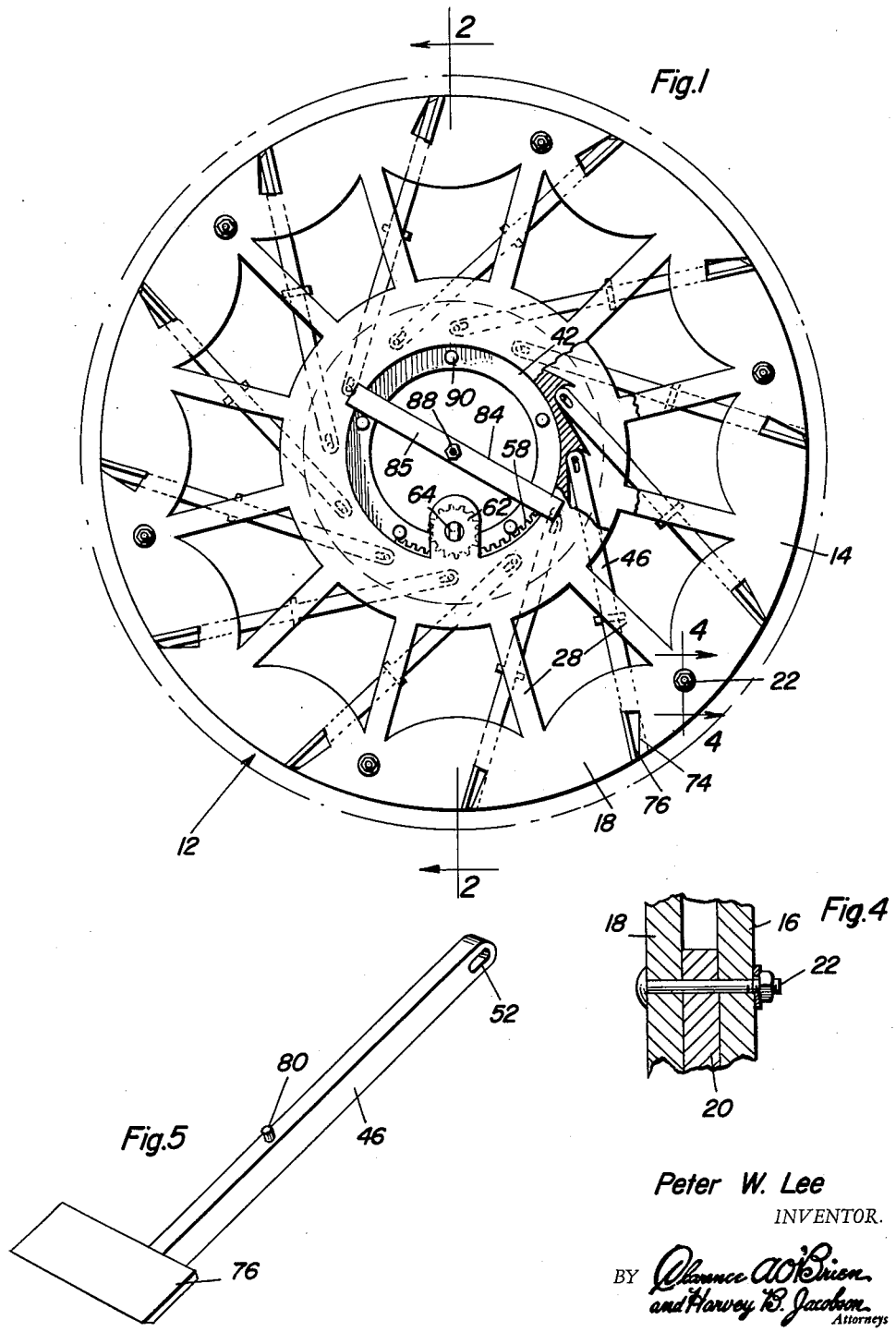

United States Patent Office 3,005,663
Patented Oct. 24, 1961

3,005,663
TRACTION DEVICE
Peter W. Lee, Rte. 2, Box 208, Port Acres, Tex.
Filed Dec. 4, 1959, Ser. No. 857,340
2 Claims. (Cl. 301—47)

This invention relates to devices for either gaining or improving traction in the operation of motor vehicles of any type.

An object of the invention is to provide a unique traction device adapted to be coupled to a wheel of a vehicle.

Briefly, a traction device in accordance with the invention has a plurality of spokes with paddles at the outer ends thereof, and the spokes are operatively connected with an adjustment mechanism within the main body of the anti-skid device, whereby the spokes may be extended or retracted in accordance with the necessities for increased traction.

An important feature of the invention is found in the fact that the spokes are capable of being completely withdrawn so that they are not ground-engaging during the times that they are not needed. However, as soon as the motor vehicle operator feels that additional traction is either necessary or desirable, appropriate adjustment is made in each anti-skid device, one applied on each of the driving wheels of the motor vehicle, to gain this increased, necessary traction.

Accordingly, it is a further object of the invention to provide structural improvements in traction devices of the type which are adapted to connect with the motor vehicle driving wheel.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front elevational view of a traction device constructed in accordance with the invention.

FIGURE 2 is a sectional view taken on the line 2—2 of FIGURE 1 and on an enlarged scale.

FIGURE 3 is a fragmentary elevational view, parts broken away in section to illustrate otherwise obscure details of the traction device.

FIGURE 4 is an enlarged sectional view taken on the line 4—4 of FIGURE 1.

FIGURE 5 is a perspective view of one of the driving spokes and paddles.

In the accompanying drawings there is an illustration of a tire 10 which diagrammatically represents any tire of any wheel of any type of motor vehicle having need or use for a traction device to improve or increase traction under some operating conditions.

Traction device 12 represents an embodiment of the invention. It is made of a main body 14 composed of an inner plate 16 and an outer plate 18. An annular spacer 20 is disposed between the confronting surfaces of the inner and outer plates, and the two plates and the spacer are connected together by means of bolts 22. Although bolts and nuts are a very simple method of construction, it is to be understood that other ways of connecting the front and rear plates to form the unified body 14, may be resorted to.

Plates 16 and 18 respectively each have annular hub-like portions 24 and 26 respectively integrally connected therewith and concentric with the outer portion of the plates. Spokes 28 and 30 are used to integrally join the rings with the outer peripheral parts of the plates. The two hub portions have annular recesses 32 and 34 (FIG. 2) which confront each other to form a circular cavity or keyway 36 within which adjusting mechanism 40 is mounted. The adjusting mechanism comprises a circular ring 42 channel-shaped in cross-section and shiftable in the cavity 36 and providing an outwardly opening circumferential groove or channel 44 (FIG. 3). A plurality of drive rods or spokes 46, each identically constructed (FIG. 5), are arranged with their inner ends located in groove 44. Smoothly curved dished portions 50 of the bottom wall of groove 44 accommodate the inner extremities of rods 46. Each rod 46 has a slot 52 at its inner extremity, and there is a pin 54 extending through the slot. The pin spans groove 44 and is attached to the ring 42.

There are means connected with ring 42 for rotationally adjusting this ring and thereby altering the position of the drive rods 46. These means consist preferably of a gear segment 58 fixed, as by rivets 60 to a limited sector of the inner circumference of member 42. Drive pinion 62 is in engagement with the teeth of segment 58, and there is a spindle 64 fixed to the pinion. The spindle is seated in a bearing 68 formed in plate 16 (FIG. 2) and extends through a bearing opening 70 formed in plate 18. A non-circular end 71 on spindle 64 enables this spindle to be more easily turned with the aid of a tool (not shown). It is quite evident from an inspection of FIGURE 1 and FIGURE 3 that when the pinion 62 is rotated, the ring 42 is correspondingly rotated thereby altering the positions of the projectable and retractable drive rods 46.

Spacer 20 and outer plate 18 have aligned slots 74 therein to allow the drive paddles 76 at the outer extremities of rods 46 to pass from a position at rest within slots 74 to an extended position (FIG. 3) in response to rotation of ring 42 in one direction. The paddles 76 protrude laterally from one side of rod 46 a greater distance than from the other side thereof to leave free the area beyond the inner surface of plate 16. When withdrawn, the paddles 76 which actually form grippers, occupy slots 74.

Each rod 46 has a pin 80 carried thereby, and the pin forms a safety stop preventing rods 46 from inadvertently separating from the traction device should there be a malfunctioning. The pin is of a length greater than the smallest width portion of typical slot 74 (FIG. 3). Further, to assure that the drive rods 46 will remain in the selected adjusted position, clamp 84 is operatively connected between ring 42 and plate 18. The clamp 84 is made of a flat bar 85 which spans the central opening of plate 18. Bar 86 is rigidly fixed at its inner end to ring 42, and it has a bolt 88 connected therewith. This bolt is also connected with bar 85 so that when the selected adjustment is achieved by rotation of pinion 62, the bolt 88 may be tightened thereby clamping member 42 with respect to plate 18.

The traction device may be secured to the wheel of the motor vehicle in any suitable fashion. One suggested method is to use the plurality of openings 90 in the innermost flange 92 (FIG. 2) of plate 16. The wheel lugs, if sufficiently long can be made to extend through holes 90, or additional bolts may be used to bolt the device to the front face of a wheel.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A traction device comprising the combination of a main body adapted to be attached to the wheel of a motor vehicle adjacent to the tire thereof and being of a diameter smaller than the diameter of the tire, said body embodying opposed spaced parallel inner and outer plates, a spacer interposed between said plates, the latter and said spacer being separably bolted together, a plurality of circumferentially spaced radial drive rods, means adjustably connected with the inner ends of said rods and carried by central hub portions of said plates for projecting said rods approximately radially outwardly from said body to ground-engaging positions, each rod having a gripper at its outer end, said spacer having a plurality of slots at the periphery thereof, and said grippers adapted to be withdrawn into said slots and moved therefrom in response to withdrawing and extending of said drive rods respectively, the means for extending and retracting said drive rods embodying a ring, means in said body mounting said ring for rotational movement, rack and pinion means for rotationally adjusting said ring, a first rigid bar having ends fixed to an inner peripheral surface of said ring, a second rigid bar spaced from but parallel to the first bar and having end portions resting firmly but removably on cooperating surfaces of one of said plates, and accessible means bolting said central portions of the bars together.

2. A traction device comprising a pair of opposed plates having coplanar hub portions and spaced rim portions joined by circumferentially spaced spokes, opposed interior surfaces of said hub portions being recessed and defining an endless circular keyway, a spacer sandwiched between the respective rim portions and rigidly but separably bolted thereto, said spacer having circumferentially spaced drive rod slots, a ring rotatably mounted in said keyway, said ring being channel-shaped in cross-section and having spaced side flanges and an interventing web, said web having circumferentially spaced shoulders related in position to the position of said slots, a plurality of drive rods having inner ends pivoted between said flanges and having thrust engagement with said shoulders, the outer ends of said drive rods operating slidingly in their respective slots, a segmental toothed rack fixed to a limited peripheral surface of said ring, a spindle mounted for rotation adjacent to said rack and provided with a pinion having teeth in mesh with the teeth of said rack, an end of the spindle being exposed and accessible beyond a surface of one of the plates to accommodate a hand tool for turning the pinion and adjusting the rack and ring, manually regulatable mechanical locking means for said ring and drive rods comprising a clamp embodying a first rigid bar having ends fixed to an inner peripheral surface of said ring, a second rigid bar spaced from but parallel to the first bar and having end portions resting firmly but removably on cooperating surfaces of one of said plates, and accessible means bolting said central portions of the bars together.

References Cited in the file of this patent

UNITED STATES PATENTS

| | | |
|---|---|---|
| 1,396,567 | Frisco | Nov. 8, 1921 |
| 2,178,105 | Maxwell | Oct. 31, 1939 |
| 2,583,634 | Darvill | Jan. 29, 1952 |

FOREIGN PATENTS

| | | |
|---|---|---|
| 400,886 | Italy | Dec. 26, 1942 |